M. A. ADLER.
COAT.
APPLICATION FILED MAR. 19, 1909.

928,017.

Patented July 13, 1909.

WITNESSES:
William Miller
Christian Almstaedt

INVENTOR
Marcus A. Adler
BY
Hauff & Warland
ATTORNEYS

UNITED STATES PATENT OFFICE.

MARCUS A. ADLER, OF NEW YORK, N. Y.

COAT.

No. 928,017.   Specification of Letters Patent.   Patented July 13, 1909.

Application filed March 19, 1909. Serial No. 484,512.

*To all whom it may concern:*

Be it known that I, MARCUS A. ADLER, a citizen of the United States, residing at New York city, county and State of New York, have invented new and useful Improvements in Coats, of which the following is a specification.

This invention relates to a coat the collar of which is attached along its entire length to the coat, and which can be worn as a storm-coat or with the collar coming up close under the chin or about the throat. For ordinary wear the collar can have its top edge brought to line with the lapel edge of the coat.

This invention is set forth in the following specification and claims and illustrated in the annexed drawing in which—

Figure 1:
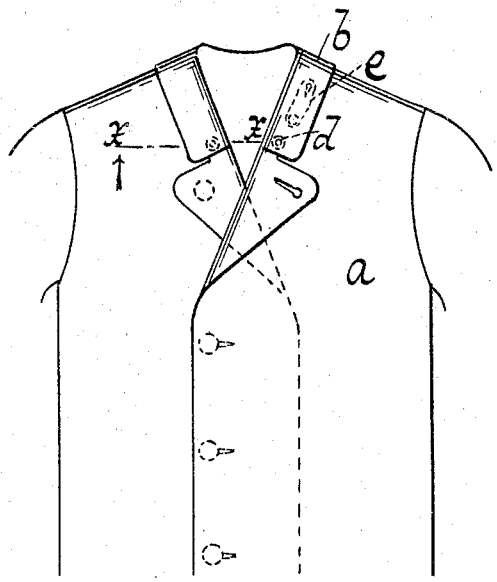
Figure 2:
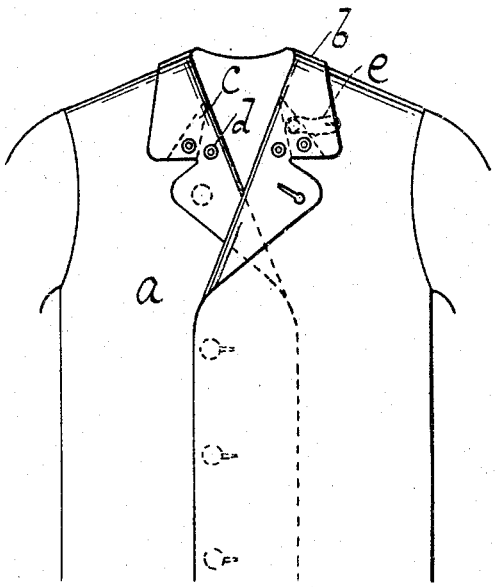
Figure 3:
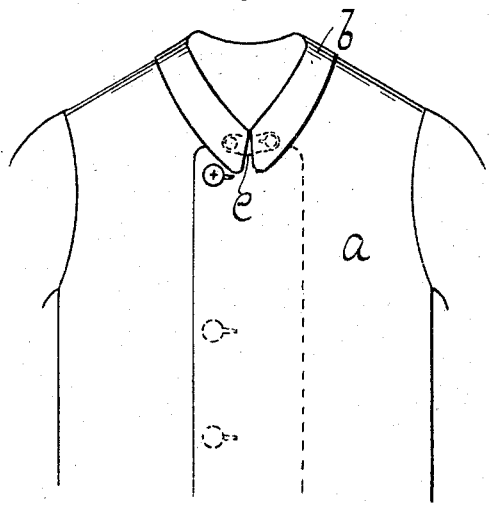
Figure 4:
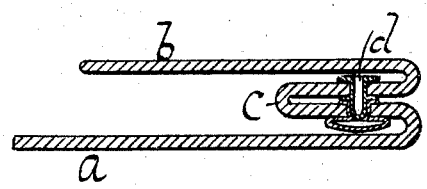

Figure 1 shows a coat with the collar arranged for ordinary wear. Fig. 2 shows a coat with the collar arranged to be worn as a storm coat. Fig. 3 shows the collar in position clasped about the neck. Fig. 4 is a section along line *x x* Fig. 1.

In this drawing the letter *a* indicates the body of the coat and *b* is the collar. The collar is attached to the coat along its entire length. Near the front portion of the collar the stand or attaching portion between the collar and the coat is adapted to be creased. In Fig. 4 the stand *c* is shown creased and held in creased position by the fasteners *d*.

When the stand *c* is held creased the collar *b* is held in line with the lapel of the coat as seen in Fig. 1, so as to give the appearance of an ordinary coat. When the fastening *d* is opened or unclasped as seen in Fig. 2, the collar can be held clasped about the throat of the wearer by a tongue *e*. This tongue is shown swiveled to one side of the coat and can be attached to the other side by means of a button or fastener so as to hold the collar closed or clasped. The coat can now be worn as a storm-coat, the collar protecting the throat of the wearer.

The stand or attachment *c* connecting the collar to the coat is of even width throughout its whole length so as to allow the collar when the fastenings *d* are open to be brought to the position shown in Fig. 3. At the same time this stand *c* can be creased as seen in Fig. 4 to allow the collar to be brought to the position shown in Fig. 1.

When worn as an ordinary coat the tongue *e* has one end unbuttoned but said tongue *e* being attached by its swivel is kept against being lost and at the same time lying under the collar is kept concealed when the coat is worn as an ordinary coat.

I claim—

1. A coat provided with a collar secured along its entire extent to said coat and having the attachment at the front portion adapted to be folded over to allow the collar to leave the throat of the wearer free and fasteners at the folded part to hold the same doubled and creased to cause the lapels of the coat to be held back and remain in smooth position while leaving the throat of the wearer free.

2. A coat provided with a collar secured along its entire extent to said coat and having the attachment at the front portion adapted to be folded over to allow the collar to leave the throat of the wearer free, and fasteners for holding the attachment folded with the lapels held back.

In testimony whereof I have hereunto set my hand in the presence of two subscribing witnesses.

MARCUS A. ADLER.

Witnesses:
   WM. C. HAUFF,
   CHRISTIAN ALMSTAEDT.